United States Patent [19]

Min et al.

[11] Patent Number: 4,756,616
[45] Date of Patent: Jul. 12, 1988

[54] IMAGE PROJECTION SYSTEM

[76] Inventors: Byung K. Min, 948 Clinton Rd., Los Altos, Calif. 94022; Charles H. Wilson, 417 Perrymont Ave., San Jose, Calif. 95125

[21] Appl. No.: 83,147

[22] Filed: Aug. 10, 1987

[51] Int. Cl.$^4$ .................................... G03B 23/02
[52] U.S. Cl. ..................... 353/113; 353/DIG. 5; 353/103
[58] Field of Search .............. 353/DIG. 1-DIG. 5, 353/113, 114, 27 R, 27 A, 23, 24, 95, 103

[56] References Cited

U.S. PATENT DOCUMENTS

| Re. 27,976 | 4/1974 | Sahley | 353/113 X |
| 3,110,217 | 11/1963 | Millner et al. | |
| 3,352,202 | 11/1967 | Woodrow | |
| 3,594,082 | 7/1971 | Lonchar | 353/DIG. 5 X |

FOREIGN PATENT DOCUMENTS 0188624 10/1984 Japan .................. 353/DIG. 5

Primary Examiner—Harry N. Haroian

[57] ABSTRACT

An image projection system having a built-in mechanism for changing unframed transparencies comprises a frame, a source of illumination, a projection lens, a stage mounted to the frame for positioning a transparency thereon for view, delivery means for gripping and slidingly moving an unframed transparency along the surface of said stage, a magazine holding a stack of unframed transparencies for insertion into the frame adjacent to said stage, feed means for feeding the uppermost transparency from a stack of transparencies in the inserted magazine, and suitable drive means. A second magazine and second feed means can be included in the system for bedirectional changing of unframed transparencies. An electrical logic circuit interfacing with a control module can be included in the system for control. The mechanism for changing unframed transparencies can be isolated and built in a detached unit for use with a conventional image projector which does not have such a built-in mechanism.

14 Claims, 8 Drawing Sheets

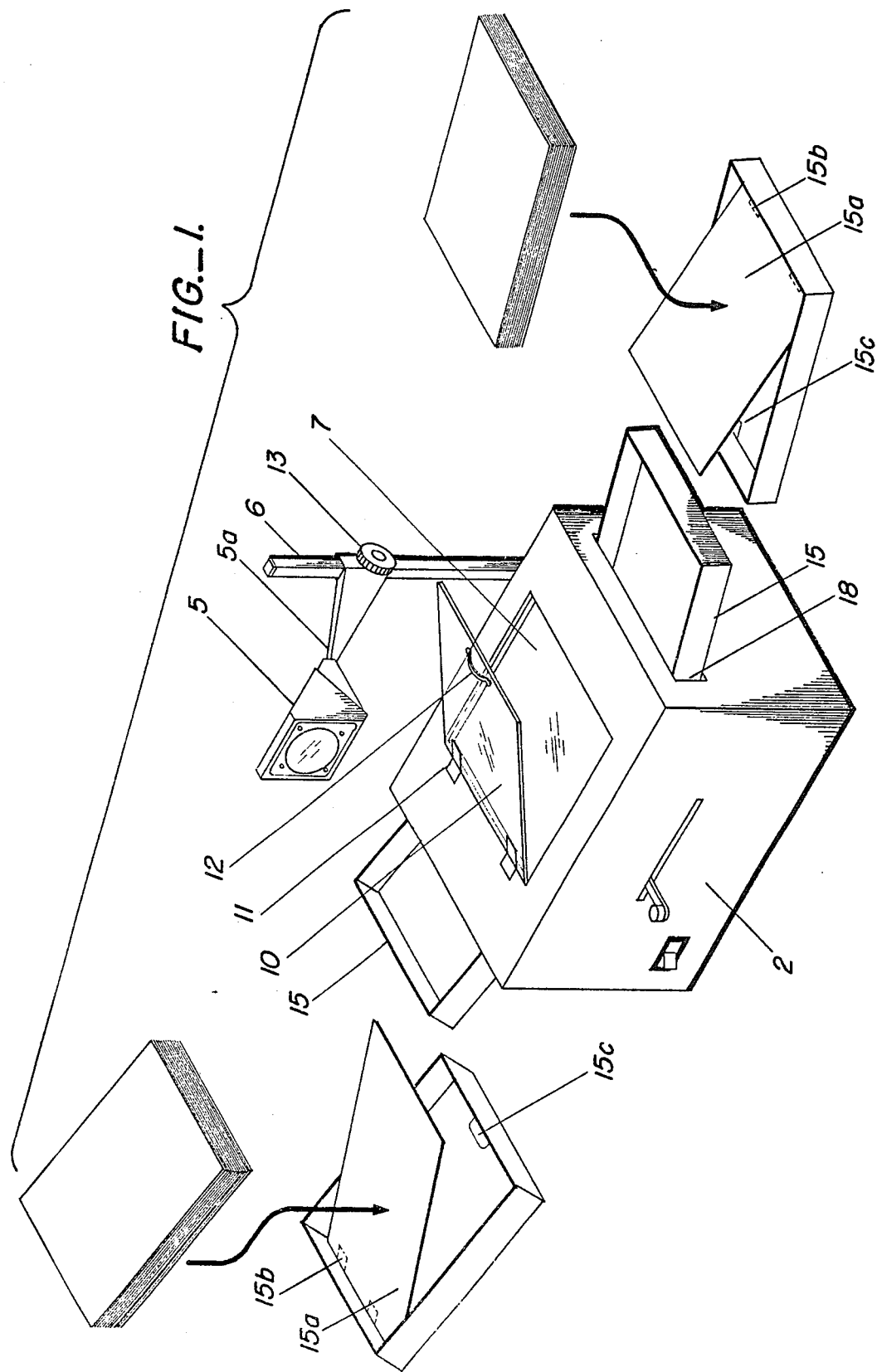
FIG._1.

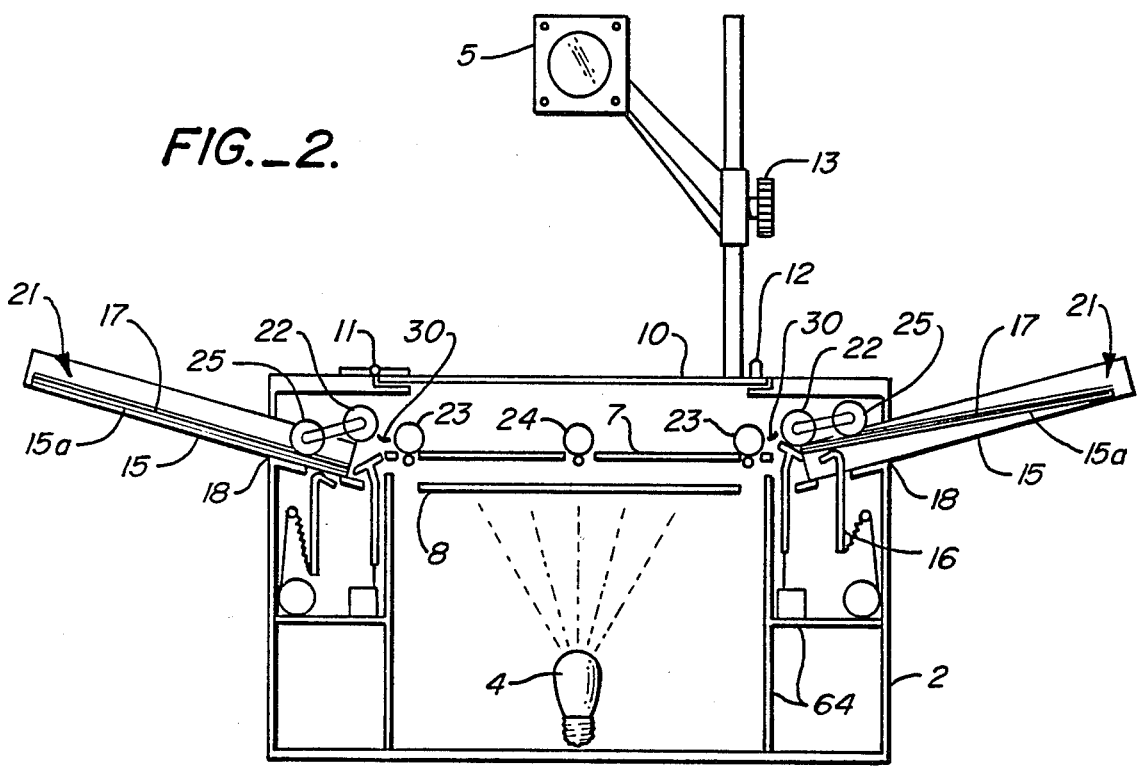
FIG._2.
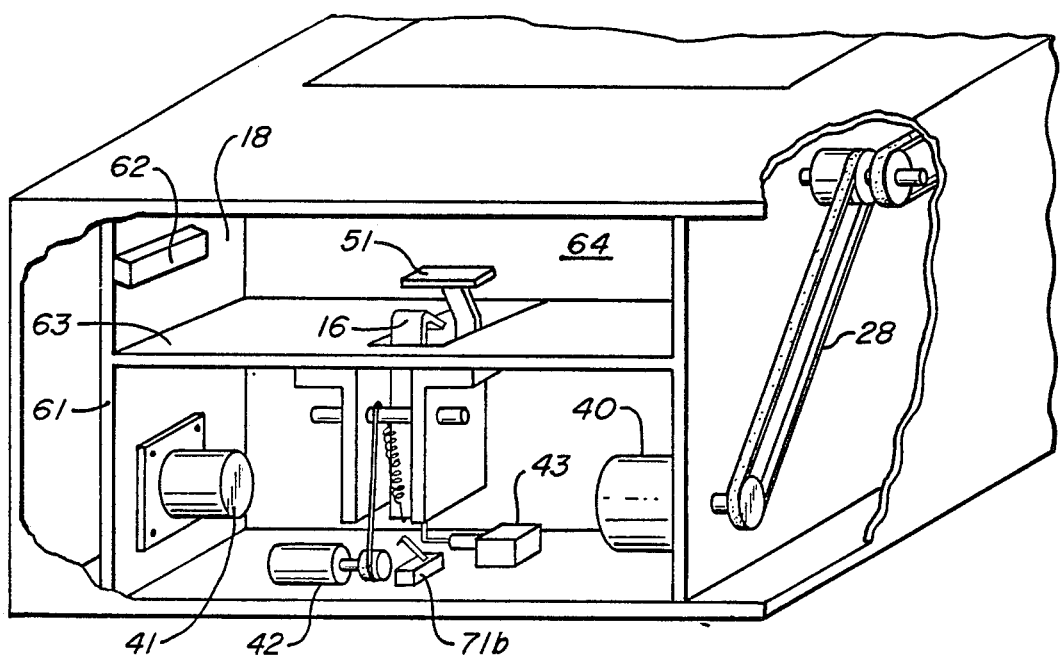
FIG._4.

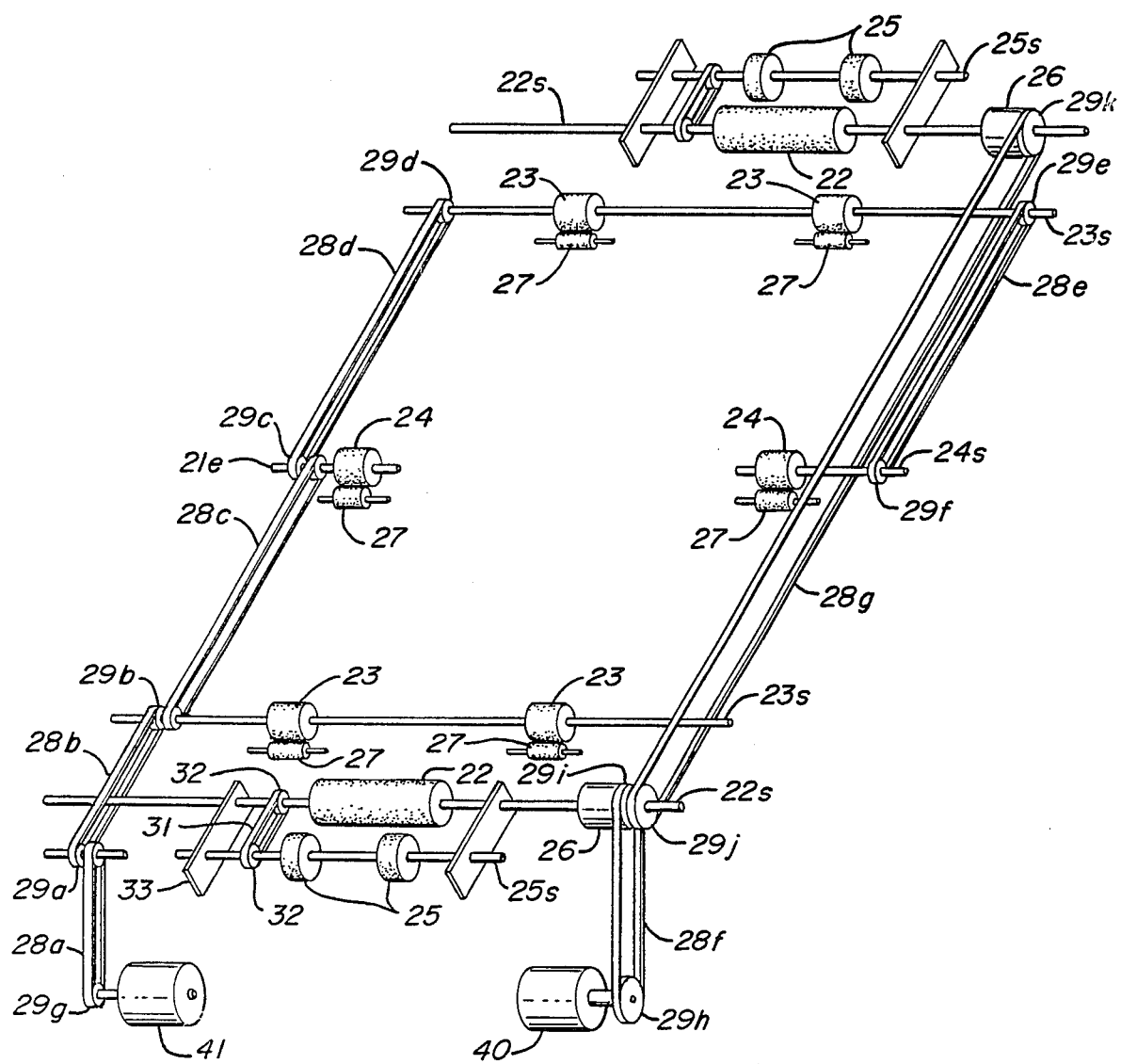
FIG._3.

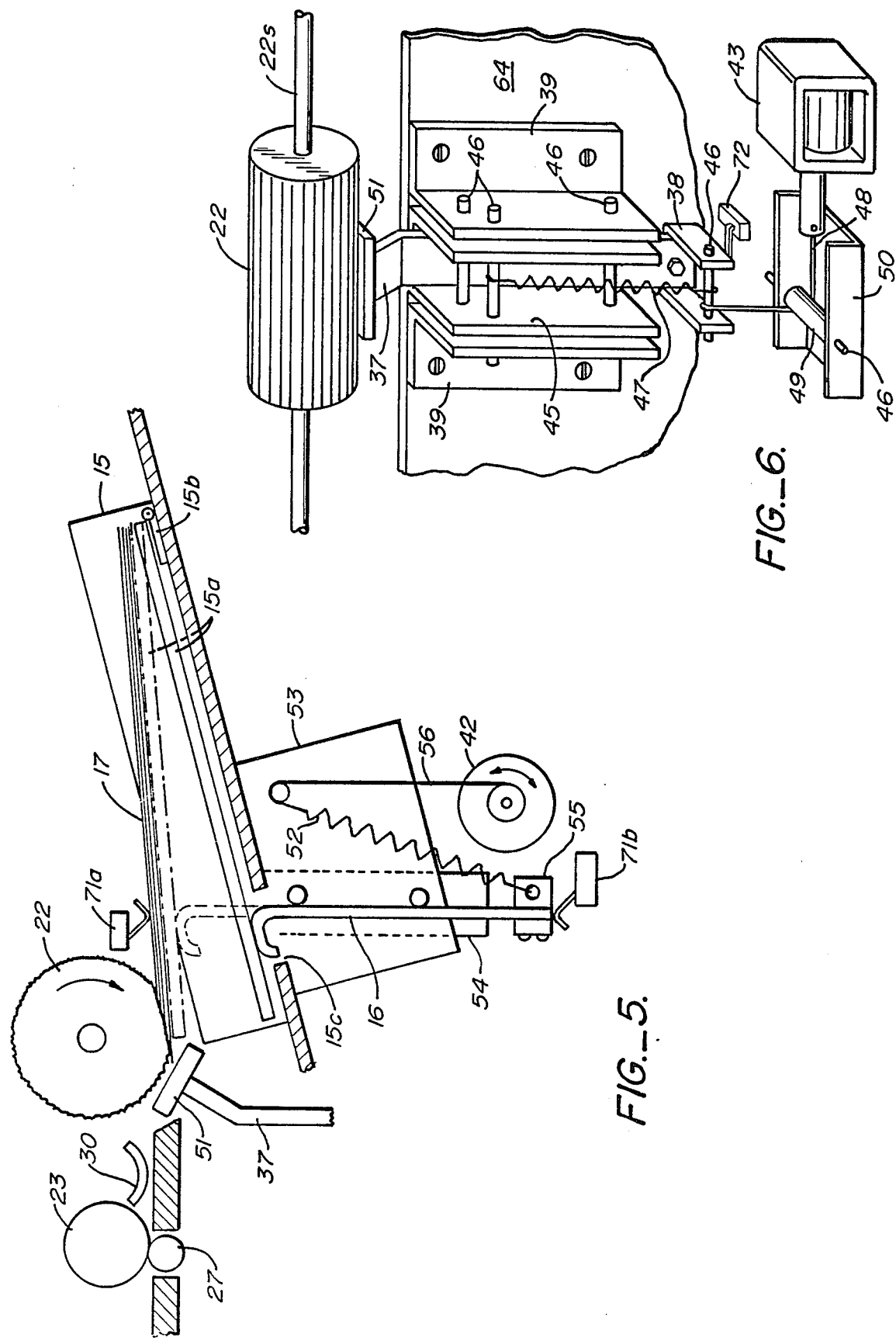

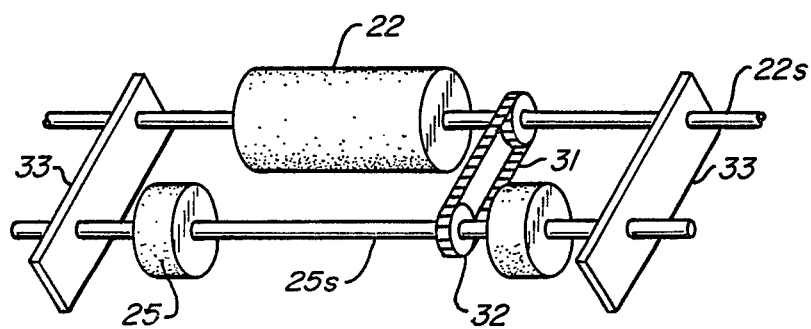
FIG._7
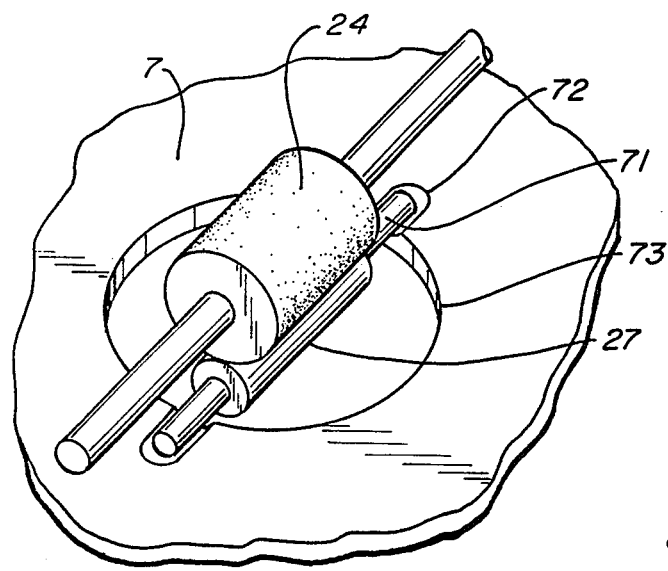
FIG._8.
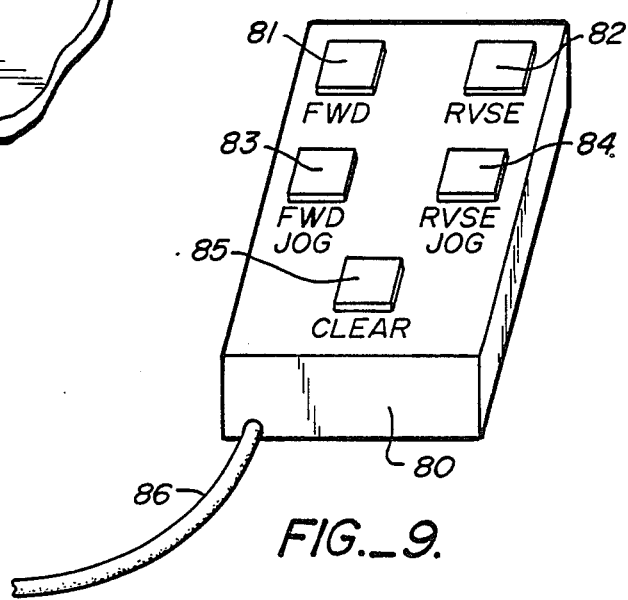
FIG._9.

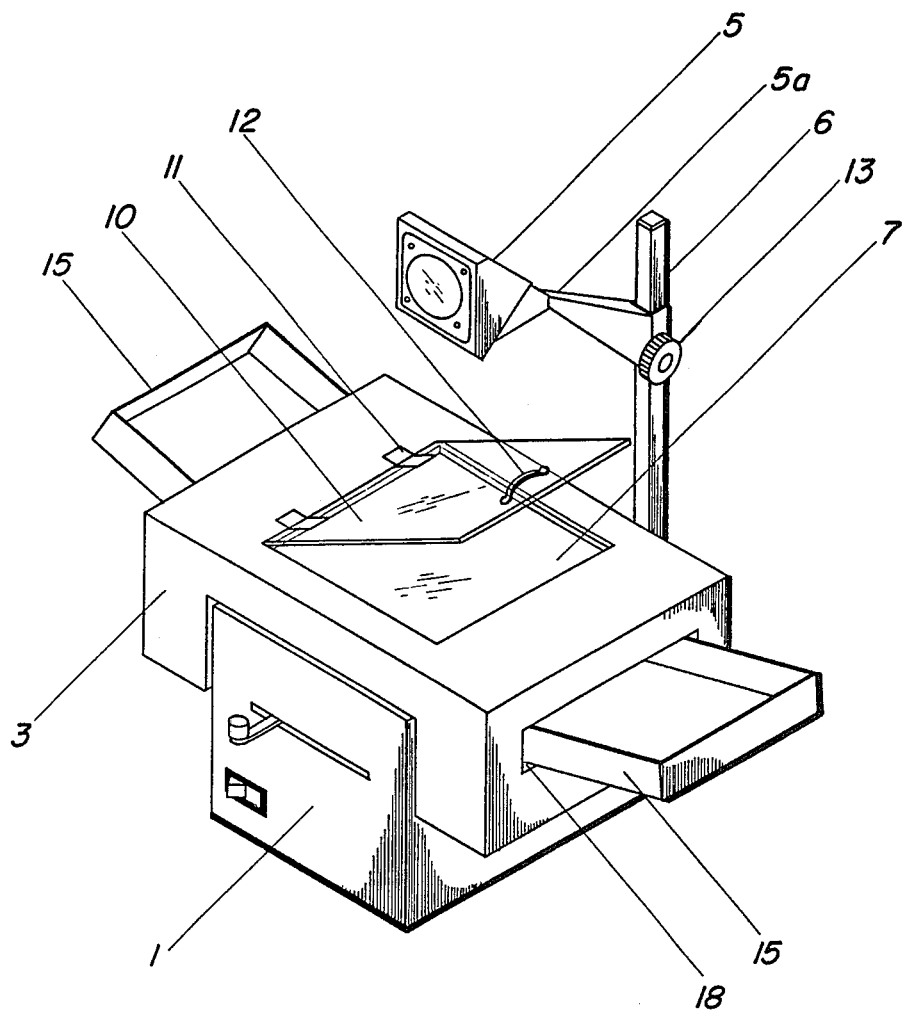
FIG._10.

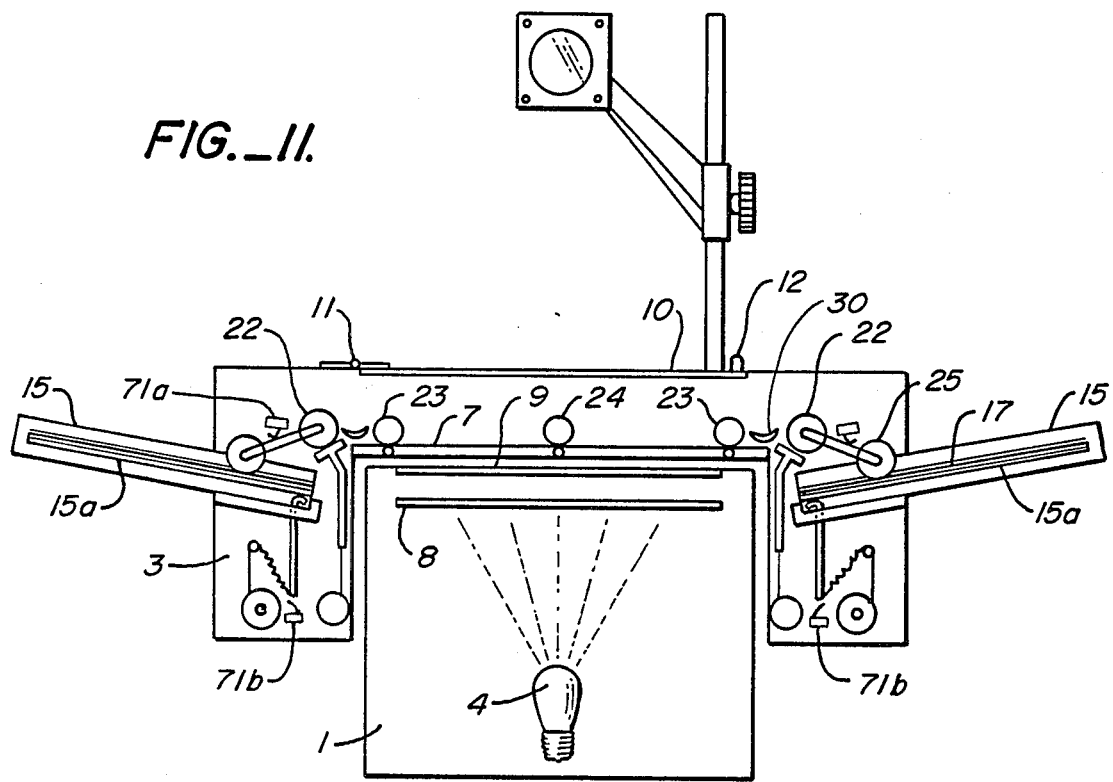

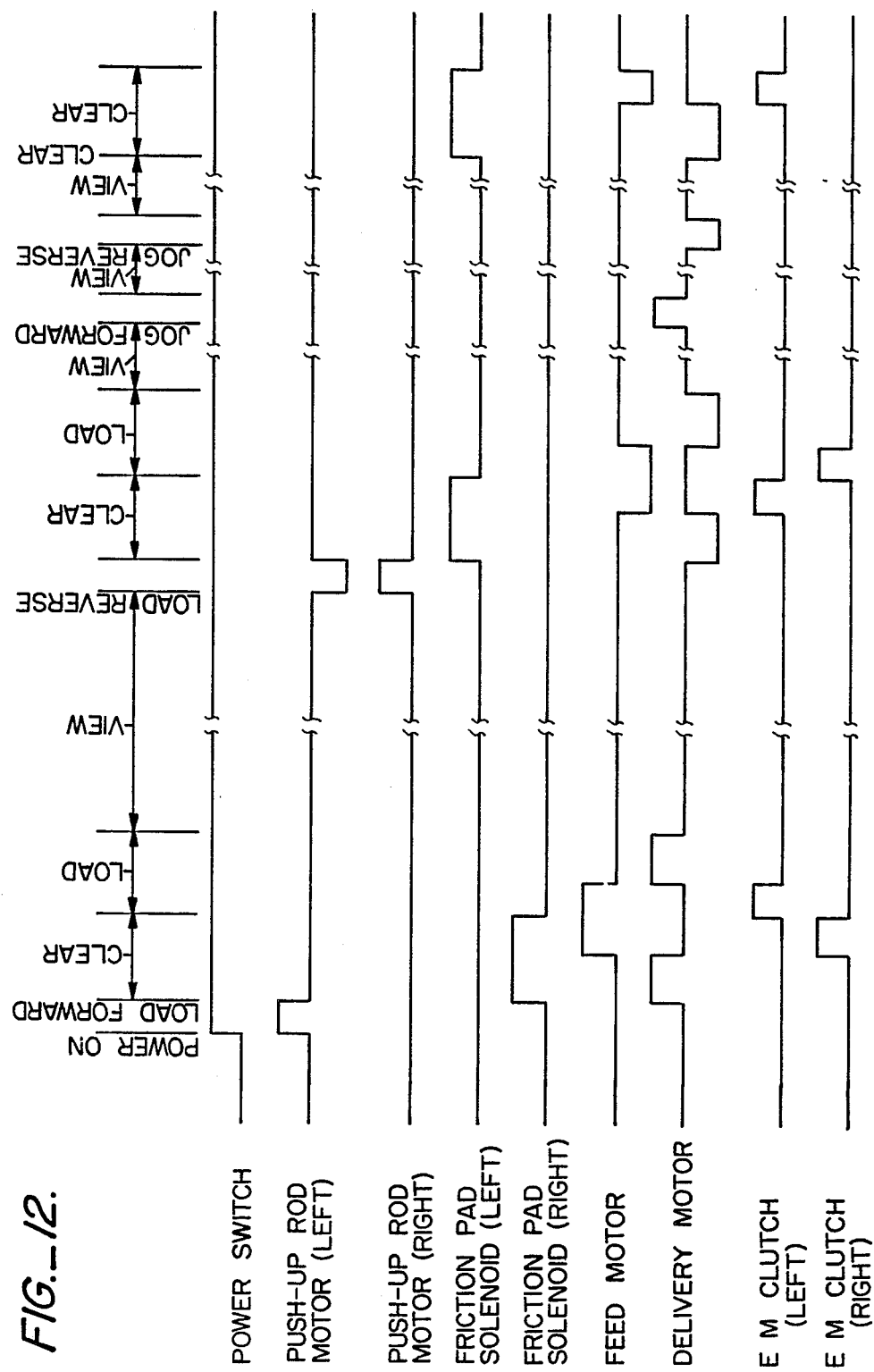
FIG._12.

IMAGE PROJECTION SYSTEM

BACKGROUND - FIELD OF INVENTION

This invention relates to an image projection system, particularly to a mechanism for changing unframed transparencies in such a system.

BACKGROUND - DESCRIPTION OF PRIOR ART

When the projected images of transparencies are used for a presentation, the transparency-changing is usually performed manually; which many speakers find not only tedious and tiresome but also disturbing especially if a substantial number of transparencies must be used. Accordingly, automatic transparency changing systems have been devised: examples are U.S. Pat. Nos. 3,594,082 and 3,110,217.

In these prior arts, the transparencies to be viewed are generally stacked in a magazine disposed next to the viewing area on an extended level surface. From this magazine, the lowermost transparency is pushed by a pusher means to the viewing area. That transparency in turn pushes any transparency existing in the viewing area to the opposite side where the latter is collected in a tray. For these mechanisms to work, each transparency must be mounted on a relatively rigid and thick frame, a requirement that most users find timeconsuming with the resulting framed transparency to be relatively bulky and inconvenient to carry when compared to an unframed transparency.

As a minimum, these devices typically include a magazine, a receiving tray, the support frames, and the delivery mechanisms in one detached unit, and occupy a relatively large space compared to the conventional overhead projector on which it is overlaid. For this reason, they are usually designed to fold down for storage, meaning that a careful installation must be performed every time they are used. Furthermore, a transparency cannot be reloaded back once unloaded unless the operation is manually interrupted. Most users, therefore, would find it desirable for a transparency changing system to permit use of unframed transparencies, to operate bidirectionally, to be compact, and preferably to be easily and permanently installed.

OBJECTS AND ADVANTAGES

Accordingly, our first object is to provide an image projection system having a built-in mechanism for changing unframed transparencies. Our second object is to provide such a system in a relatively compact permanent unit that does not require folding and unfolding. Our third object is to provide such a system that also permits bidirectional transparency changing.

Additional objects are to provide a transparency changing system having the capabilities as described in the above in a detached unit for use with a conventional image projector which does not have such a built-in mechanism, and to provide such a system in a relatively compact permanent unit that does not require folding and unfolding.

To meet the first object, the system comprises a frame, a source of illumination, a projection lens, a stage mounted to the frame for positioning a transparency thereon for view, means for slidingly delivering unframed transparencies along the surface of said stage, and a magazine holding a stack of unframed transparencies to be viewed. The frame has an access port through which the magazine must be inserted for feed means to engage; however, the magazine need to be inserted only partially, permitting the frame to save space otherwise occupied by the magazine: this helps to meet the second object. When not in use, the magazine may be separated from the enclosure, freely transported, and stored independently together with a stack of transparencies, an additional convenient feature. To meet the third object, a second magazine, second feed means, and means for restacking a transparency in an inserted magazine can be included in the system.

To meet the additional objects, the mechanism for changing unframed transparencies can be easily isolated and built in a compact detached unit for use by overlaying on a conventional image projector which does not have such a built-in mechanism.

DRAWING FIGURES

FIG. 1 shows a perspective view of an integral image projection unit with a bidirectional transparency changing mechanism.

FIG. 2 shows an elevated view of the same.

FIG. 3 shows a perspective view of the driving mechanisms.

FIG. 4 shows a perspective view of the magazine support structures.

FIG. 5 shows a side view of the push-up assembly used for urging the push-up plate.

FIG. 6 shows a perspective view of the friction pad push-up mechanisms.

FIG. 7 shows a perspective view of the restacking mechanisms.

FIG. 8 shows a perspective view of the support rollers.

FIG. 9 shows a perspective view of the hand-held control box.

FIG. 10 shows a perspective view of a detached transparency changing unit overlaid on a conventional overhead projector.

FIG. 11 shows an elevation view of the same shown in FIG. 10.

FIG. 12 shows the timing sequence of major parts during a typical operation of the preferred embodiment.

DRAWING REFERENCE NUMERALS 1. enclosure for a conventional overhead projector
2. enclosure for an integral image projection system with a built-in transparency changing system
3. enclosure for a detached transparency changing system
4. light source
5. lens and mirror housing
6. post
7. viewing glass
8. Fresnel lens
9. viewing glass
10. viewing glass
11. hinge
12. handle
13. focusing knob
15. magazine
15a. push-up plate
15b. hinge
15c. opening
16. push-up rod
17. a stack of transparencies
18. access port
22. feed roller 22s. feed roller shaft
23. delivery roller
23s. delivery roller shaft
24. portrait delivery roller
24s. portrait delivery roller shaft
25. restacking roller
25s. restacking roller shaft
26. electromagnetic clutch
27. support roller
28. timing belt
29a through 29h. pulley
30. guide
31. drive chain
32. one way clutch
33. connector
37. push-up rod
38. end place
39. support angle
40. stepping motor for feed rollers
41. stepping motor for delivery rollers
42. DC motor for push-up rod
43. solenoid for friction pad
45. guide
46. pin
47. tension spring
48. string
49. bushing
50. U-channel
51. friction pad
52. tension spring
53. support angle
54. guide
55. end piece
56. string
61. internal support frame
62. magazine guide
63. slanted support floor for magazines
64. divider
71a,b microswitch
72. microswitch
73. microswitch
80. remote control box
81. forward load button
82. reverse load button
83. forward jog button
84. reverse jog button
85. clear button
86. electrical wire

DESCRIPTION OF THE PREFERRED EMBODIMENT

Referring to FIGS. 1 and 2, a box-like enclosure 2 which is generally wider than that of a conventional overhead projector, but otherwise of about the same dimensions as the latter, contains most of the optical, mechanical, and electrical components needed for image projection and transparency changing.

The optical components include a light source 4 mounted to the enclosure 2, a Fresnel lens 8 horizontally mounted to the enclosure above the light source 4, a viewing glass 7 mounted horizontally right above the Fresnel lens 8, a lens and mirror housing 5 positioned outside the enclosure directly above the viewing glass 7 using a bracket 5a connected to a post 6 which is mounted to the enclosure, and a knob 13 used to focus the lens housed in 5 by sliding the bracket 5a along the post 6. These basic elements of a conventional overhead projector are well known to those skilled in the art.

A second viewing glass 10 is mounted above the viewing glass 7 at the level of the top surface of the enclosure using a pair of hinges 11. A handle 12 is mounted on 10 whereby 10 may be lifted open. 4, 8, 7, 10, and 5 are substantially aligned in that order so that the magnified image of a transparency placed on the viewing glass 7 or 10 may be projected to a screen in front of the lens and mirror housing 5.

Referring to FIGS. 1, 2, 4, and 5, a pair of magazines 15 are interchangeably used to hold the transparencies both before and after view. The enclosure 2 is provided with a pair of access port 18 on opposing side walls where the magazines must be inserted for operation. FIG. 5 shows a detailed cross section of the magazines. A push-up plate 15a is placed on the floor of the magazine 15, and hinged at the rear end by a pair of hinges 15b. Each magazine is provided on the floor with an opening 15c through which a push-up rod 16 mounted to the enclosure must travel to lift the push-up 15a from below.

An embodiment of the transparency push-up assembly is shown in FIGS. 2 and 4, and in more detail, in FIG. 5. The push-up rod 16 is actuated by a reversible DC motor 42 and moves along a guide 54 which has an end piece 55 connected to a tension spring 52. This spring is connected to a flexible string 56 to which the pulling force from the DC motor 42 is transmitted. The guide 54 is secured in place by joining them using a plural of pins (not shown) to a pair of angle 53, which is bolted to a slanted floor 63 from underneath. The limiting switches 71a and 71b are electrically wired with the DC motor 42 and with the logic circuits (not shown) and used to limit the travel of the push-up rod. When the push-up rod 16 is raised, the uppermost of the transparencies 17 held by the push-up plate 5a makes contact with the "feed roller" 22 with a suitable contact which is applied by the spring 52.

An embodiment of the friction pad push-up assembly is shown in FIG. 6. A friction pad 51 is mounted on a push-up rod 37 which moves along the guide 45 mounted using a plural of pins 46 on supporting angles 39 which are bolted to the divider 64. A push-up force is applied by a tension spring 47 connecting an end piece 38 to one of the pin 46. When raised, the friction pad 51 makes contact with suitable pressure with the feed roller 22 adjacent to the magazine. The push-up rod 37 may be lowered by pulling the end piece 38 downward using a pull-type solenoid 43 connected to the end piece 38 by a string 48. This string 48 is guided by a bushing 49 mounted on a pin 46 which is supported by a U-channel 50 bolted to the floor of the enclosure 2. Feed rollers 22 are driven by a stepping motor 40 whose torque is transmitted by pulleys 29h-k and timing belts 28f-g. An electromagnetic clutch 26 is used to selectively drive the right or left side feed rollers.

Referring to FIGS. 2 and 3, the delivery rollers 23 and the portrait delivery rollers 24 are driven by a stepping motor 41 whose torque is transmitted by pulleys 29a-g and timing bolts 28a-e. The portrait delivery rollers 24 are used for delivering transparencies in the portrait mode. The rollers 23 and 24 are spring-mounted (not shown) to the enclosure so that they are in suitable contact with the support rollers 27 which are mounted on the viewing glass 7.

Referring to FIG. 8, the support rollers 27 is made of a tubing rotating on a shaft 71 which is mounted on the viewing glass between grooves 72 in a circular hole 73.

A restacking roller 25 is mounted on the restacking roller shaft 25s which is connected to the feed roller shaft 22s by a connecting rod 33. The connecting rod 33 is mounted on both shafts 25s and 22s using free wheeling needle bearings which does not interfere with the rotation of either shaft. A one way clutch 32 is installed on one or both of the shafts 22s or 25s and a drive chain 31 is installed between them to allow torque to be transmitted from 22s to 25s in the direction appropriate for restacking, i.e., outward from the viewing area.

The restacking roller 25 must have the same diameter as the feed roller 22 to prevent dragging or slipping of a transparency during feeding. During feeding, due to the friction between the transparency and the roller 25, the motion of the transparency may drive the roller 25 which may then drive the roller 22 making an infinite loop for torque transmission. If the diameter of 25 is different from that of 22, the incompatibility in driving rate may result in dragging or buckling of the transparency. Between feed roller 22 and delivery roller 23 is placed a transparency-guide 30 which is mounted to the enclosure 2.

The preferred embodiment of the hand-held control box 80 is shown in FIG. 9. It holds push button switches commanding load forward 81, load reverse 82, jog forward 83, jog reverse 84, and clear 85, respectively. This box interfaces with suitable electronic circuits housed in the enclosure 2 through a electrical wire 86. The electronic logic circuits for the present purpose may be easily designed and built by a person skilled in the art, and therefore are not shown here.

FIGS. 11 and 12 show another embodiment of the invention. The enclosure 3 has an inverted U-shape so it can be laid over the main enclosure 1 of a conventional overhead projector. This "detached" unit will work with a conventional overhead projector to utilize the present transparency changing system. The enclosure 3 contains all the mechanial and electrical means of transparency changing, the same way as in the above "integral" unit. However, this enclosure 3 does not contain image projection means such as the Fresnel lens 8 and the light source 4 which are contained in a conventional overhead projector. In this embodiment, the viewing glass 7 becomes part of the bottom surface of the middle portion of the enclosure 3. When 3 is overlaid on 1, the viewing glass 7 of the detached unit is overlaid on the viewing glass 9 of the conventional overhead projector.

OPERATION OF THE PREFERRED EMBODIMENT

The operation of the invention is explained below. FIG. 20 shows the timing sequence of major parts during a typical operation of the preferred embodiment. The loading, unloading, and jogging function may be performed bidirectionally by remote control. The operations commanded by the function switches in the control module are described below in detail.

POWER-ON

1. Check by a suitable sensor (not shown) if both magazines 15 are present. If not, issue a warning signal (not shown), stop, and wait until their presence is sensed. Both magazines must be inserted at this time if not already done so.

2. Check the position of the push-up plate in both magazines using microswitches 71a and 71b as position sensor. Jump to the next step if the positions are found correct. If not, raise the push-up plate of the left magazine and lower the push-up plate of the right magazine. This function is performed by actuating the DC motor 42 in an appropriate direction.

Upon completion of the power-on function, the left magazine is in the feed-ready state and the right in the receive-ready state.

LOAD FORWARD (clear the viewing area and load from left to right)

When this button is pushed, the following events take place sequentially by an electronic logic, position sensors, and control means.

Clear

3. Check the position of the friction pad in both magazines using microswitch 72 as position sensor. Jump to the next step if the positions are found correct. If not, raise the left friction pad and lower the right friction pad. This function is performed by actuating the solenoids 43.

4. Check if there is a transparency on the viewing glass 7. The microswitch 73 detect the presence or absence of a transparency in the viewing area. They also detect whether the transparency is in a landscape or portrait mode. If a transparency is not detected, go to the step 7 below.

5. If a transparency is detected, actuate the stepping motor 41 to move the transparency from the viewing area as far to the right side as it can, i.e., until the tail end of the transparency just clears the viewing area by delivering roller 23 on the right side.

6. The restacking roller 25 is then driven by engaging the electromagnetic clutch 26 on the right and actuating the stepping motor 40 for a predetermined amount of steps in the appropriate direction to restack the transparency on the right magazine.

Feed

7. Engage the electromagnetic switch 26 on the left, and actuate the stepping motor 40 to turn the feed roller shaft 22s and the feed roller 22 in the appropriate direction for a predetermined amount of steps. The feed roller 22 rotating in the proper direction grips the uppermost transparency in an upwardly urged stack of transparencies by friction and cause it to advance past the contact point between feed roller 22 and friction pad 51; any other transparencies attracted by the advancing uppermost transparency are prevented from advancing by said friction pad because the friction between the friction pad and a transparency is greater than the friction between two transparencies. The separated uppermost transparency is then brought to the nip of the delivery roller 23.

Delivery

8. Actuate the stepping motor 41 for a predetermined number of steps to move the transparency from the nip of the feed roller 22 toward the viewing area until it is centered in the viewing area between the left and right delivery rollers 23.

LOAD REVERSE (clear the viewing area and load from right to left)

This gives the same function as the above except that the left-right relationship reverses.

JOG FORWARD (move to right)

When this button is pushed, the stepping motor 41 is actuated in the appropriate direction to allow a differential translation of transparencies to the right. The motor is actuated as long as the button is pushed. If the button is pushed long enough to bring the transparency out of the viewing area, then this is detected by the microswitch 73 and the clear command, the steps 1 through 6 in the above, is implemented.

JOG REVERSE (right to left)

This gives the same function as the above except that the left-right relationship reverses.

CLEAR

When this button is pushed, the steps 3 through 6 in the above take place in the "current" direction and the transparencies are restacked in the current receiving magazine. If a current direction cannot be determined (all push-up plates and friction pads are in down position, for instance,) then the power-on function, the steps 1 and 2, are repeated and the transparency returns to the right magazine by default.

MANUAL Transparency CHANGING

When preferred, transparency changing may be performed manually using the second viewing glass 10 provided at the top of the enclosure 2. A transparency loaded on the viewing glass 10 may be viewed by refocusing the lens in 5 using the knob 13.

We claim:

1. An image projection system having a built-in mechanism for changing unframed transparencies, comprising:

(1) a frame having an access port;

(2) a stage mounted horizontally to said frame, said stage having a first end and a second end opposite to each other, said access port being near the first end of said stage, said stage having between the first end and the second end a transparent viewing area in which a transparency to be viewed is positioned, said viewing area having a first end near the first end of the stage and a second end near the second end of said stage;

(3) a source of illumination for illuminating the image of a transparency positioned in the viewing area;

(4) a projection lens assembly for focusing the image of a transparency positioned in the viewing area on a projection surface;

(5) delivery means mounted to said frame for gripping a transparency and slidingly moving the transparency along the surface of said stage;

(6) a magazine having a front end and a bottom floor, the bottom floor having an opening near the front end;

(7) a push-up plate positioned inside said magazine and having a front end substantially aligned with the front end of said magazine, said push-up plate being adapted to hold a stack of unframed transparencies thereon inside said magazine, said transparencies having a front end substantially aligned with the front end of said push-up plate;

(8) guiding supports mounted to said frame near the access port for allowing insertion of said magazine at the front end so that said magazine is disposed near said stage, the front end of the inserted magazine being adjacent to the first end of said stage and at a level below that of said stage;

(9) push-up means mounted to the frame below and near the front end of the inserted magazine for urging the front end of the push-up plate upward through the opening in the bottom floor of the magazine;

(10) feed means mounted to the frame above and near the front end of the inserted magazine for feeding the uppermost transparency from an upwardly urged stack of transparencies, and for advancing the transparency to said stage where said delivery means may engage;

(11) means for generating a first drive command and a second drive command in a pre-established sequence;

(12) first drive means, responsive to the first drive command, for driving said feed means;

(13) second drive means, responsive to the second drive command, for driving said delivery means.

2. An image projection system as defined in claim 1, wherein said delivery means comprises:

(21) a first roller; and

(22) a second roller, both having a high coefficient of friction relative to that of a transparency to be viewed, each roller being springmounted to said frame for gripping a transparency by friction against said stage so that the rotation of said rollers against the transparency causes the transparency to slide along the surface of said stage, said first roller positioned near the first end of the viewing area and said second roller positioned near the second end of the viewing area, the first roller having a rotational axis parallel to that of the second, said first roller being spaced from said second roller a distance less than the length of the transparency so that the transparency maintains contact with at least one of said rollers while in the viewing area.

3. An image projection system as defined in claim 1, wherein said feed means comprises:

(31) a feed roller having a high coefficient of friction relative to that of a transparency, said feed roller being mounted to said frame above the front end of the inserted magazine so that the front end of the uppermost transparency in an upwardly urged stack of transparency makes contact with said feed roller at approximately the lowest point of the roller;

(32) a friction pad having a moderately high coefficient of friction relative to that of a transparency and a substantially flat surface, said friction pad being mounted to said frame underneath said feed roller adjacent to the front end of the inserted magazine;

(33) means for urging said friction pad upwardly so that said friction pad makes contact with said feed roller at an inclined angle adjacent to the front end of the uppermost transparency, so that said feed roller rotating in an appropriate direction grips the uppermost transparency by friction and cause it to advance past the contact point between said feed roller and said friction pad, any transparency attracted by the advancing uppermost transparency being prevented from advancing by said friction pad.

4. An image projection system as defined in claim 1, further comprising

(41) first means for energizing the first drive means;

(42) second means for energizing the second drive means;

(41) electronic logic circuit means for generating a clear command, a load command, and a jog command;

(42) a control module having a plurality of function switches electrically interfaced with said electronic logic circuit means and with the first means for energizing and the second means for energizing; said function switches including

(43) a first switch, responsive to the clear command, for energizing the second drive means to discharge any transparency from the viewing area;

(44) a second switch, responsive to the load command, for energizing the second drive means to discharge any transparency from the viewing area, for energizing the first drive means to feed the uppermost transparency from an upwardly urged stack of transparencies, and for energizing the second drive means to deliver the transparency to the viewing area;

(45) a third switch, responsive to the jog command, for energizing the second drive means for jogging a transparency in the viewing area.

5. An image projection system as defined in claim 1, further comprising for bidirectional changing of unframed transparencies:

(51) said frame having a second access port near the second end of said stage;

(52) a second magazine, substantially identical to the first;

(53) guiding supports mounted to said frame near the second access port for allowing insertion of the second magazine at the front end so that the second magazine is disposed near said stage, the front of the second magazine being adjacent to the second end of said stage and at a level below that of said stage;

(54) second push-up means mounted near the second end of said stage substantially the same way and for the same purpose as the first;

(55) second feed means mounted near the second end of said stage substantially the same way and for the same purpose as the first;

(56) means for generating a first energize command and a second energize command in a pre-established sequence;

(57) first means for energizing, responsive to first energize command, for energizing said first push-up means;

(58) second means for energizing, responsive to second energize command, for energizing said second push-up means, so that said magazines take alternately a feed-ready state when the push-up plate is urged upward and a receive-ready state when the push-up plate is not urged;

(59) means for generating a third drive command and a fourth drive command in a pre-established sequence;

(510) third drive means, responsive to third drive command, for driving said second feed means;

(511) fourth drive means, responsive to fourth drive command, for driving said delivery means bidirectionally.

6. An image projection system as defined in claim 5, wherein included is means for moving a transparency discharged from the view area for restacking purpose, comprising:

(61) restacking means mounted to said frame for moving a transparency discharged from the viewing area after view from said stage into a magazine in the receive-ready state;

(62) means for generating a restack command in a predetermined sequence;

(63) means, responsive to the restack command, for driving said restacking means.

7. An image projection system as defined in claim 5, wherein included is means for moving a transparency discharged from the viewing area for restacking purpose, comprising:

(71) a first feed roller shaft mounted to said frame for driving the first feed roller;

(72) a first restacking roller;

(73) a first restacking roller shaft for driving said restacking roller;

(74) link means having a first end and a second end, the first end being pivotally connected to the first feed roller shaft, the second end being pivotally connected to the first restacking roller shaft,

(75) means for transmitting torque from the first feed roller shaft to the first restacking roller shaft,

(76) means for generating a restack command in a predetermined sequence;

(77) means, responsive to the restack command, for driving the first feed roller shaft.

8. An unframed transparency changing system for use with an image projector of the type having
a frame;
a stage mounted horizontally to said frame;
a source of illumination for illuminating the image of a transparency positioned in said stage;
a projection lens assembly for focusing the image of a transparency positioned in said stage on a projection surface; comprising:

(1) a frame having an access port and a flat bottom, said flat bottom being overlaid on an image projector of the type described;

(2) a stage mounted horizontally to said frame at the flat bottom, said stage having a first end and a second end opposite to each other, said access port being near the first end of said stage, said stage having between the first end and the second end a transparent viewing area in which a transparency to be viewed is positioned, said viewing area havng a first end near the first end of said stage and a second end near the second end of said stage;

(3) delivery means mounted to said frame for gripping a transparency and slidingly moving the transparency along the surface of said stage;

(4) a magazine having a front end and a bottom floor, the bottom floor having an opening near the front end;

(5) a push-up plate positioned inside said magazine and having a front end substantially aligned with the front end of said magazine, said push-up plate being adapted to hold a stack of unframed transparencies thereon inside said magazine, said transparencies having a front end substantially aligned with the front end of said push-up plate;

(6) guiding supports mounted to said frame near the access port for allowing insertion of said magazine at the front end so that said magazine is disposed near said stage, the front end of the inserted magazine being adjacent to the first end of said stage and at a level below that of said stage;

(7) push-up means mounted to the frame below and near the front end of the inserted magazine for urging the front end of the push-up plate upward through the opening in the bottom floor of the magazine;

(8) feed means mounted to the frame above and near the front end of the inserted magazine for feeding the uppermost transparency from an upwardly urged stack of transparencies, and for advancing the transparency to said stage where said delivery means may engage;

(9) means for generating a first drive command and a second drive command in a pre-established sequence;

(10) first drive means, responsive to the first drive command, for driving said feed means;

(11) second drive means, responsive to the second drive command, for driving said delivery means.

9. An unframed transparency changing system as defined in claim 8, wherein said delivery means comprises:

(21) a first roller; and

(22) a second roller, both having a high coefficient of friction relative to that of a transparency to be viewed, each roller being springmounted to said frame for gripping a transparency by friction against said stage so that the rotation of said rollers against the transparency causes the transparency to slide along the surface of said stage, said first roller positioned near the first end of the viewing area and said second roller positioned near the second end of the viewing area, the first roller having a rotational axis parallel to that of the second, said first roller being spaced from said second roller a distance less than the length of the transparency so that the transparency maintains contact with at least one of said rollers while in the viewing area.

10. An unframed transparency changing system as defined in claim 8, wherein said feed means comprises:

(31) a feed roller having a high coefficient of friction relative to that of a transparency, said feed roller being mounted to said frame above the front end of the inserted magazine so that the front end of the uppermost transparency in an upwardly urged stack of transparency makes contact with said feed roller at approximately the lowest point of the roller;

(32) a friction pad having a moderately high coefficient of friction relative to that of a transparency and a substantially flat surface, said friction pad being mounted to said frame underneath said feed roller adjacent to the front end of the inserted magazine;

(33) means for urging said friction pad upwardly so that said friction pad makes contact with said feed roller at an inclined angle adjacent to the front end of the uppermost transparency, so that said feed roller rotating in an appropriate direction grips the uppermost transparency by friction and cause it to advance past the contact point between said feed roller and said friction pad, any transparency attracted by the advancing uppermost transparency being prevented from advancing by said friction pad.

11. An unframed transparency changing system as defined in claim 8, further comprising

(41) first means for energizing the first drive means;

(42) second means for energizing the second drive means;

(41) electronic logic circuit means for generating a clear command, a load command, and a jog command;

(42) a control module having a plurality of function switches electronically interfaced with said electronic logic circuit means and with the first means for energizing and the second means for energizing; said function switches including

(43) a first switch, responsive to the clear command, for energizing the second drive means to discharge any transparency from the viewing area;

(44) a second switch, responsive to the load command, for energizing the second drive means to discharge any transparency from the viewing area, for energizing the first drive means to feed the uppermost transparency from an upwardly urged stack of transparencies, and for energizing the second drive means to deliver the transparency to the viewing area;

(45) a third switch, responsive to the jog command, for energizing the second drive means for jogging a transparency in the viewing area.

12. An unframed transparency changing system as defined in claim 8, further comprising for bidirectional changing of unframed transparencies:

(51) said frame having a second access port near the second end of said stage;

(52) a second magazine, substantially identical to the first;

(53) guiding supports mounted to said frame near the second access port for allowing insertion of the second magazine to the front end so that the second magazine is disposed near said stage, the front end of the second magazine being adjacent to the second end of said stage and at a level below that of said stage;

(54) second push-up means mounted near the second end of said stage substantially the same way and for the same purpose as the first;

(55) second feed means mounted near the second end of said stage substantially the same way and for the same purpose as the first;

(56) means for generating a first energize command and a second energize command in a pre-established sequence;

(57) first means for energizing, responsive to first energize command, for energizing said first push-up means;

(58) second means for energizing, responsive to second energize command, for energizing said second push-up means, so that said magazines take alternately a feed-ready state when the push-up plate is urged upward and a receive-ready state when the push-up plate is not urged;

(59) means for generating a third drive command and a fourth drive command in a pre-established sequence;

(510) third drive means, responsive to third drive command, for driving said second feed means;

(511) fourth drive means, responsive to fourth drive command, for driving said delivery means bidirectionally.

13. An unframed transparency changing system as defined in claim 12, wherein included is means for moving a transparency discharged from the viewing area for restacking purpose, comprising:

(61) restacking means mounted to said frame for moving a transparency discharged from the viewing area after view from said stage into a magazine in the receive-ready state;

(62) means for generating a restack command in a predetermined sequence;

(63) means, responsive to the restack command, for driving said restacking means.

14. An unframed transparency changing system as defined in claim 12, wherein included is means for moving a transparency discharged from the viewing area for restacking purpose, comprising:

(71) a first feed roller shaft mounted to said frame for driving the first feed roller;

(72) a first restacking roller;

(73) a first restacking roller shaft for driving said restacking roller;

(74) a link means having a first end and a second end, the first end being pivotally connected to the first feed roller shaft, the second end being pivotally connected to the first restacking roller shaft,

(75) means for transmitting torque from the first feed roller shaft to the first restacking roller shaft;

(76) means for generating a restack command in a predetermined sequence;

(77) means, responsive to the restack command, for driving the first feed roller shaft.

* * * * *